Sept. 16, 1969     T. B. BURNETT     3,467,858
SYSTEM FOR MEASURING HIGH VOLTAGE LINE PARAMETERS UTILIZING
OPTICAL TRANSMISSION PATH
Filed May 6, 1966            6 Sheets-Sheet 1

Thomas B. Burnett
INVENTOR

ATTORNEYS

United States Patent Office 3,467,858
Patented Sept. 16, 1969

3,467,858
SYSTEM FOR MEASURING HIGH VOLTAGE LINE PARAMETERS UTILIZING OPTICAL TRANSMISSION PATH
Thomas Brian Burnett, Stafford, England, assignor to The English Electric Company Limited, London, England, a British company
Filed May 6, 1966, Ser. No. 556,791
Claims priority, application Great Britain, May 14, 1965, 20,476/65
Int. Cl. G01r *31/08*
U.S. Cl. 324—52     8 Claims

ABSTRACT OF THE DISCLOSURE

A system for measuring an electrical parameter, e.g., voltage, current, impedance, etc. of a high voltage transmission line utilizing an optical path between the line and ground for measurement of the line current so as to avoid the need for high insulation levels on the equipment employed. In particular, circuit means energised from the line itself monitor the current through the line and convert it into a train of pulses having a repetition rate proportional to the current magnitude. These pulses are then transmitted as light impulses to ground level where they are converted back into electrical signals. The line voltage is similarly monitored and converted into a pulse train, and the current and voltage quantities are then processed; a protective circuit breaker may be activated in dependence on the result if this is indicative of a fault on the line.

---

This invention relates to electrical measuring systems for measuring an electrical characteristic of a high voltage transmission line, and particularly, but not exclusively, relates to systems for the measurement of high voltage line current and fault impedance.

It has previously been proposed to measure the current in a high voltage transmission line by a current transformer having solid insulation between its primary and secondary windings and which will withstand the full system voltage. However, as the system voltage and current ratings increase, so also does the cost of the current transformer, and the system becomes uneconomical.

From one aspect, this invention consists in a system for measuring an electrical characteristic of a high voltage transmission line comprising means on said line for monitoring the current through said line and converting said current into a train of pulses having a repetition rate proportional to the magnitude thereof, transmitting means activated in response to said pulses to emit pulsating light signals and receiving means remote from the line for receiving and processing said signals to derive therefrom a measurement of the said characteristic.

Preferably, the system further comprises means for monitoring the voltage of said line and converting said voltage into a train of pulses having a repetition rate proportional to the magnitude thereof, the receiving means being operative to receive and process both the current- and voltage-representing pulse trains.

In order that the invention can be fully understood, some embodiments thereof will now be described with reference to the accompanying drawings in which:

FIGURE 1 is a block diagram of a system according to this invention;

FIGURES 2(a) to 2(g) are timing diagrams of electrical signals developed in various parts of the circuit in FIGURE 1;

Briefly, the system described employs pulse generators at the high voltage line which produce pulses at a repetition rate proportional to the instantaneous value of line current. These pulses activate light emitters and the light pulses emitted are received by photo-electric cells on the ground. A count is made of these received pulses, and by comparing this count with a count of similar pulses indicative of the line voltage the line impedance may be determined and the position of a line-ground or line-line fault determined. Alternatively, the system can readily be employed to measure line current only, or the power or kva. of the transmission system.

In one method for protecting transmission lines the system is divided into a number of sections, each capable of being isolated by circuit breakers at their ends. When a fault occurs it is desirable for only the faulty section of the system to be interrupted. Relays are, therefore, provided at each circuit breaker, and make a continuous comparison of the impedance of the system with the impedance of the section with which they are associated. When a fault occurs the impedance of the system is reduced, and if it becomes less than the impedance of a section the relays indicate a fault in that section. The comparison of impedances takes the form of the comparison of V and $IZ_0$, where V and I are the voltage and current respectively at the relay, and $Z_0$ is the impedance (or perhaps the reactance or resistance alone, or some function thereof) of the section which the relay is protecting. If V is greater than $IZ_0$, the fault is assumed outside the section, and if V is less than $IZ_0$, the fault is assumed inside the section.

In the proposed system the currents and voltages are converted into trains of pulses whose repetition rate is proportional to the instantaneous value of current or voltage. For determining the location of the fault, the number of voltage pulses over a given interval is compared with the number of current pulses over the same or a different interval, these intervals being a small fraction of one cycle of the system frequency. Examination of this comparison is made at least once each half-cycle. If the number of voltage pulses is greater than the number of current pulses, the fault is taken to lie outside the protected section. If the number of current pulses exceeds the number of voltage pulses, the fault is taken to lie within the protected section.

Figure 1:
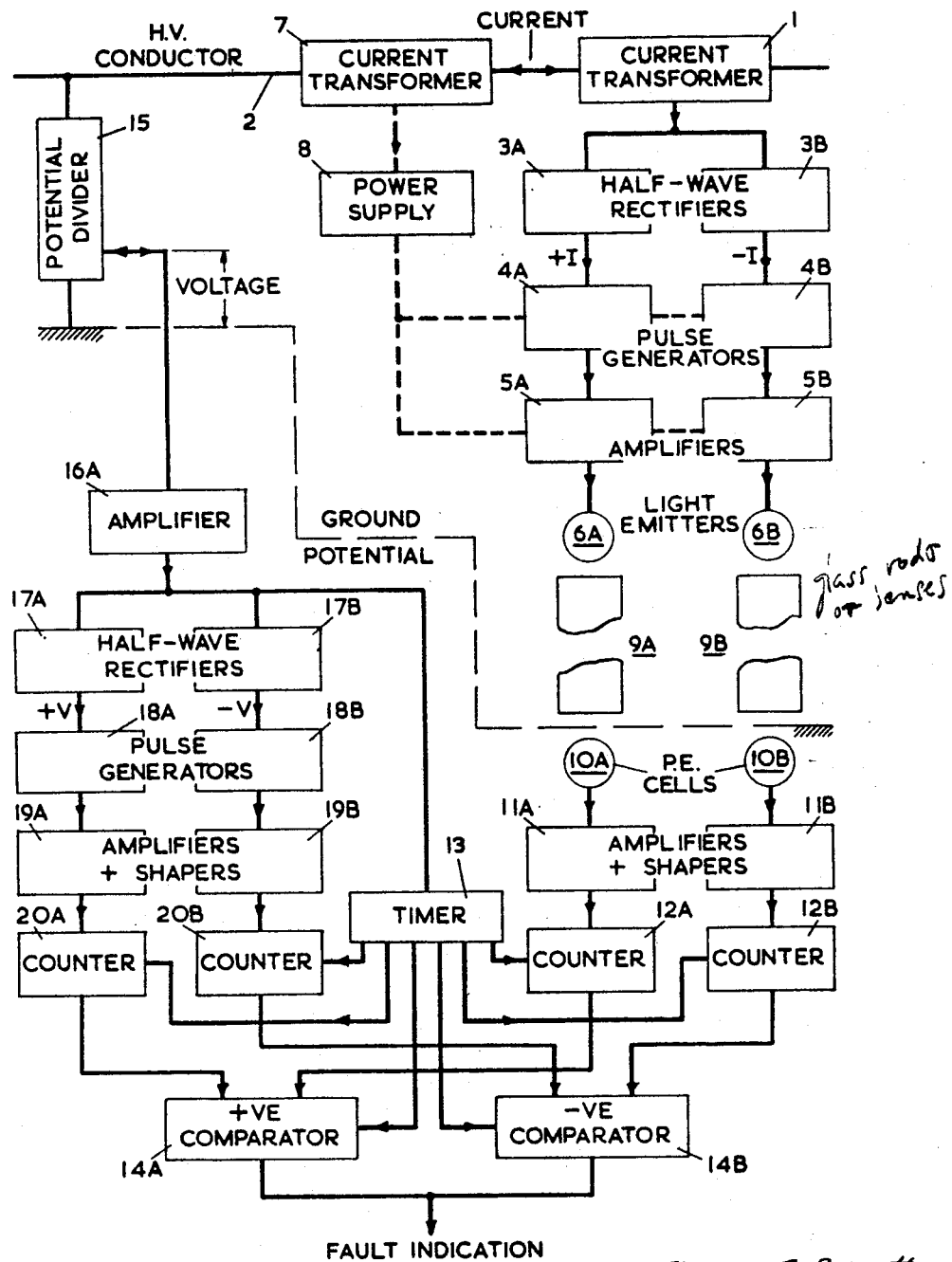

Referring now more particularly to FIGURE 1, there is shown a current transformer 1 which is coupled to a high voltage conductor 2. This transformer has only low voltage insulation, and transforms the line current to a lower value. The positive and negative half-cycles of the transformed current are separated by half-wave rectifiers 3A and 3B respectively, and are fed to pulse generators 4A and 4B.

These pulse generators produce pulses whose repetition rate is proportional to the instantaneous value of this current, and they may conveniently be of the type described in co-pending patent application No. 548,204 filed on May 6, 1966 in respect of an invention by T. B. Burnett and D. A. Ball, assigned to the same assignees as in the present case, entitled "Improvements in Pulse Generators." This rate may conveniently be between 1,000 and 100,000 pulses per second, the pulse width being of the order of 1 microsecond.

These pulses are fed to amplifiers 5A and 5B, which in turn energise light emitters 6A and 6B, e.g. gallium arsenide or gallium phosphide diodes, which transmit light pulses to the ground.

A separate power supply for the pulse generators 4A, 4B and the amplifiers 5A and 5B is developed from a further current transformer 7 and a power supply unit 8.

The light pulses from the emitters 6A and 6B are transmitted to the ground through optical systems 9A, 9B comprising light guides, e.g. glass rods or lenses. To prevent the optical system from being contaminated, the light guides or lenses may be housed in a conventional shedded porcelain insulator bushing.

Two photo-electric cells 10A, 10B, e.g. of the silicon solar cell type, are located at the ends of the optical systems 9A, 9B, respectively, and the outputs from these cells are amplified and shaped by amplifiers 11A, 11B, and applied to pulse counters 12A, 12B.

A timing circuit 13 is connected to the pulse counter and permits each counter to respond to a number of incoming pulses occurring in predetermined intervals and the outputs from the counters are applied to a first input in each of two comparators 14A, 14B. In particular, the comparator 14A receives pulse counts derived from the positive half-cycle and the comparator 14B receives pulse counts derived from the negative half-cycle.

The system also includes means for developing pulses proportional to the voltage of the high voltage line.

In particular, these means include a potential divider 15, which may be a resistive or capacitive divider or a voltage transformer, and may conveniently be housed in the same insulator bushing as that housing the optical system 9A, 9B.

The output from the potential divider is fed to an amplifier 16A and is then fed to two half-wave rectifiers, 17A, 17B, which separate the positive and negative half cycles of the voltage, and to the timer 13.

The outputs from the rectifiers 17A, 17B are applied to pulse generators 18A, 18B which produce pulses whose repetition rate is proportional to the instantaneous value of the voltage, and the pulse outputs are fed to amplifier and shaper circuits 19A, 19B. In turn, the outputs from these latter circuits are fed to pulse counters 20A, 20B which respond to the incoming pulses occurring in predetermined intervals determined by the timer 13, and the outputs from the counters 20A, 20B are respectively applied to a second input in each of the comparators 14A, 14B.

The input from the amplifier 16A to the timer 13 is utilised to determine the instant of zero voltage and the timer produces timing pulses related to this instant. In particular, the timing pulses start and stop the pulse counters and reset the comparators 14A, 14B during each cycle.

Figure 2:
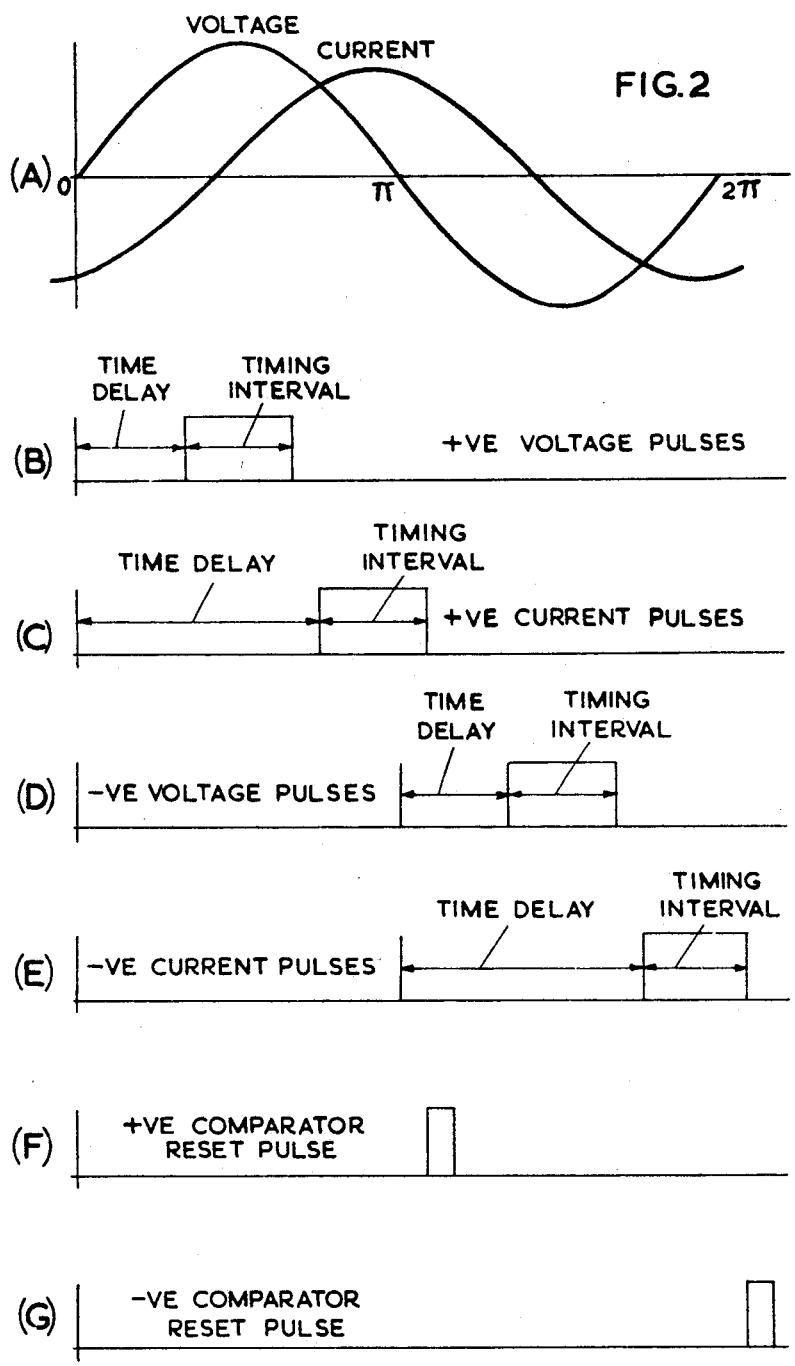

Referring now more particularly to FIGURES 2(a) to 2(g), the line voltage and current excursions are shown in FIGURE 2(a). The output from the timer 13 to the pulse counter 20A and the output to the pulse counter 12A are shown in FIGURES 2(b) and 2(c), respectively, from which it will be seen that the positive voltage-derived pulses are counted during an interval between 90°−α° and 90°+α° (where α is of the order of 30°), and the positive current-derived pulses are counted between 90°−α°+φ° and 90°+α°+φ°. The angle φ° is related to the impedance of the protected section, since it is indicative of the phase displacement between the voltage and current cycles.

Similarly, the negative voltage-derived pulses in pulse counter 20B are counted during the interval of the timing pulse in FIGURE 2(d) and the negative current-derived pulses in counter 12B are counted during the interval of the timing pulse in FIGURE 2(e). The positive counts are compared in the comparator 14A and the negative counts are compared in the comparator 14B.

If the current derived pulse count should exceed the voltage derived pulse count in either of the comparators then a line-ground fault is assumed to have occurred in the protected section, as mentioned above, and a fault indication may be given in the case of either one or both of the comparators exhibiting such excess count.

Figure 3:
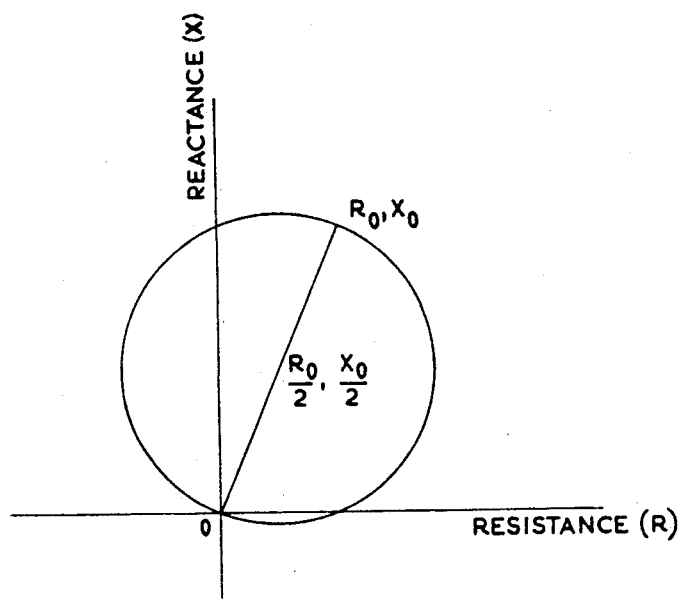
FIGURE 3 is a graphical representation of the locus of fault impedance values plotted on a resistance-reactance complex plane.

The locus of fault impedance values plotted on the resistance-reactance complex impedance plane which would give equal numbers of voltage and current derived pulses approximates to a circle, as shown in FIG. 3. The constants of the system would normally be so arranged that all possible line-ground faults would lie within this circle.

A reset pulse is applied to the comparator 14A (FIGURE 2(f)) and to the comparator 14B (FIGURE 2(g)) at the conclusion of the comparison period during each cycle.

As an alternative to deriving the voltage and current pulse counts during different intervals, the line current could be fed through an impedance, possibly a replica of the impedance of the protected section, so as to develop a voltage to be applied to the pulse generators 4A and 4B; in this way, this current-derived voltage would be in phase with the line voltage and the comparison could be effected during the same time interval. Alternatively, to achieve this purpose, the pulse generators 4A, 4B could be fed from voltages proportional to both the instantaneous line current and the rate of change of line current. A still further alternative is to produce an appropriate phase shift of the line-ground voltage through an impedance network.

Figure 4:
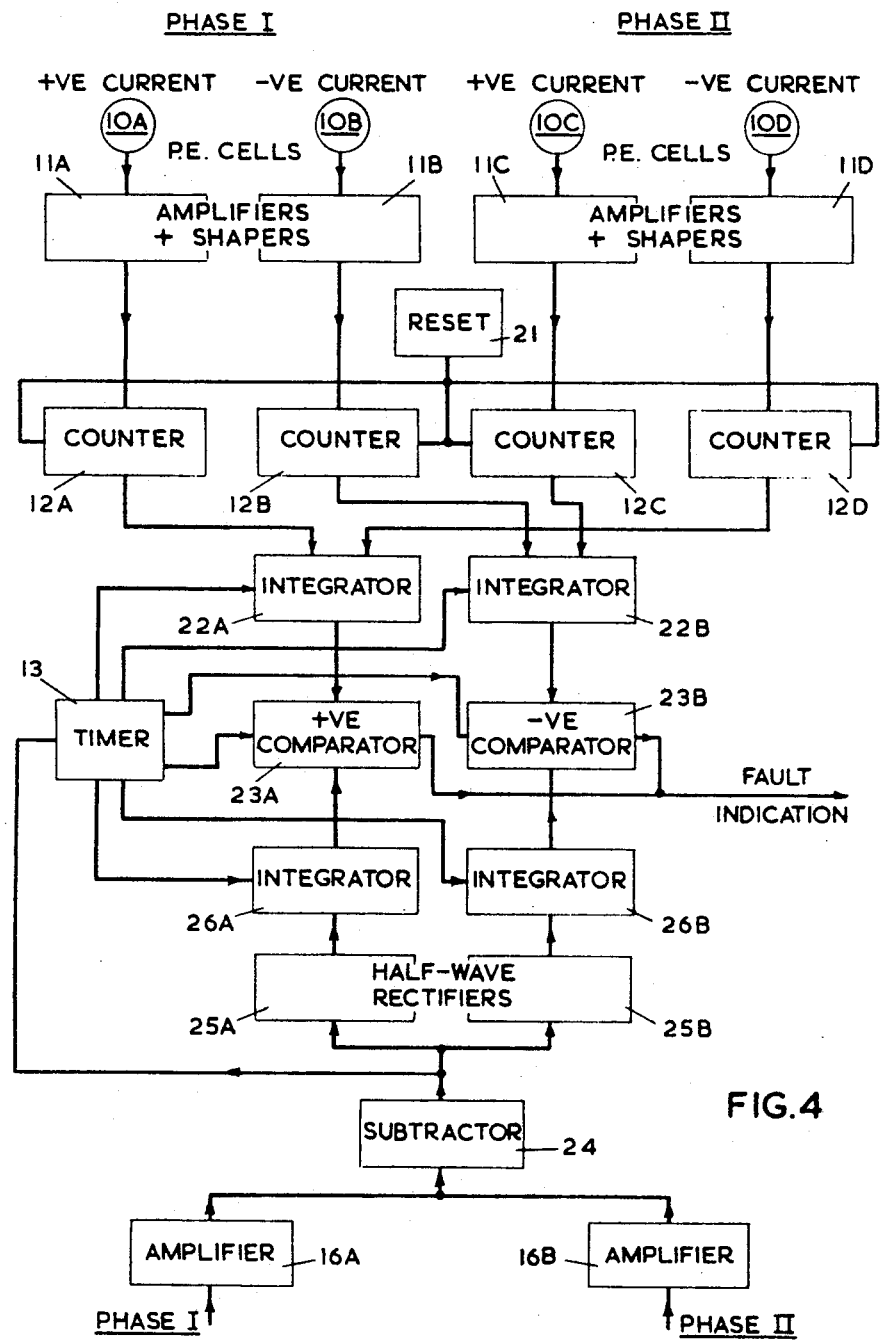
FIGURE 4 is a block diagram of light-receiving circuitry employed in line-to-line impedance measurement.

In FIGURE 4 there is shown an arrangement for determining line-line faults.

For this purpose only the "receiver" circuits associated with two phases are shown, the "transmitting" circuits, that is, the circuits labelled 1 to 6B in FIGURE 1, and the potential dividers 15, being the same for both phases.

Phase I includes two photo-electric cells 10A, 10B for the positive and negative current-derived light pulses and the outputs from these photo-electric cells are applied to pulse amplifiers and shapers 11A, 11B, and thence to pulse counters 12A, 12B. Similarly, phase II includes two photo-electric cells 10C, 10D, and the outputs are applied to pulse amplifiers and shapers 11C, 11D and thence to pulse counters 12C, 12D.

A reset circuit 21, controlled from the timer 13, is connected in common to these pulse counters to reset the counters after each counting period.

The pulse counts derived from the positive current of phase I and the negative current of phase II are integrated in a timed integrator 22A and the pulse counts from the negative current of phase I and the positive current of phase II are integrated in an integrator 22B, these integrators being controlled by timing pulses from the timer 13.

The outputs from these integrators are therefore representative of any difference between the currents in the two phases e.g. the current circulating in a line-line fault; and are fed to two comparators 23A, 23B for comparison with signals derived from any difference in the line-ground voltages in the two phases I and II.

These latter signals are derived by feeding to the amplifiers 16A, 16B the proportional line-ground voltages of phase I and phase II, respectively. The outputs from these amplifiers are then fed to a subtractor 24, the output of which is representative of the line-line voltage. The output from the subtractor 24 is fed to both the timer 13 and to half-wave rectifiers 25A, 25B which separate the voltage into positive and negative half cycles. The positive half cycles are fed to an integrator 26A and the negative half cycles are fed to an integrator 26B, these integrators being controlled by timing pulses from the timer 13.

The output from the integrator 26A is then compared with the output from the integrator 22A in the comparator 23A, and the output from the integrators 26B is compared with the output from the integrator 22B in the comparator 23B. As before, an excess of the current-representing inputs from the integrators 22A, 22B over the voltage-representing inputs from the integrators 26A, 26B will give rise to a fault indication.

Figure 5:
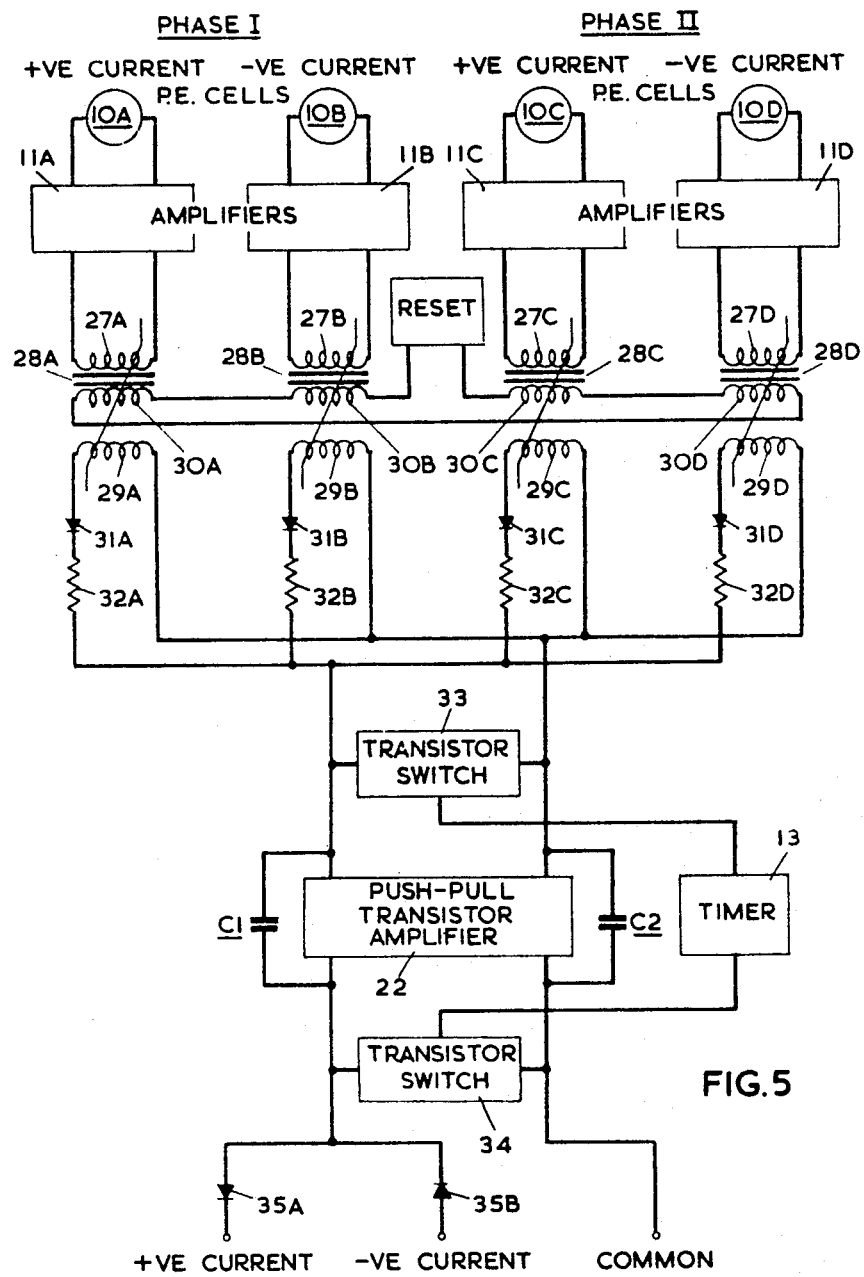
FIGURE 5 is a more detailed circuit diagram of pulse counting circuits employed in FIGURE 4.

A more detailed circuit illustrating a means of counting the pulses from the current-derived signals in FIGURE 4, by integration of constant voltage-time area pulses, is shown in FIGURE 5.

Referring to this figure, the amplified pulses from the photo-electric cells 10A–10D are applied to primary windings 27A–27D, respectively of saturable cores 28A–28D, so that pulses of constant voltage-time area are developed on the secondary windings 29A–29D of these cores. The saturable cores are reset, between pulses, by a D.C. current applied to windings 30A–30D from the reset circuit 21, and in order to prevent any output voltage being developed when the saturable cores are being reset, the secondary windings are connected to half-wave rectifiers 31A–31D.

The required outputs from the secondary windings 29A–29D are fed through resistors 32A–32D, respectively, to the inputs of the integrators 22A, 22B, represented in this figure as a schematic composite circuit 22 and two transistor switches 33, 34. This integrator comprises a push-pull transistor amplifier with capacitor feedback (C1, C2) from output to input, and the two transistor switches 33, 34 are respectively connected across the input and output of the integrator, the switches being controlled by pulses from the timer 13 which open them when the input signal voltages are to be integrated. The output from the integrator is then separated into positive and negative half-cycles by rectifiers 35A, 35B, for comparison with the voltage derived outputs in the comparators 23A, 23B.

The principles of this circuit could also be employed for the counters shown in FIGURE 1.

Figure 6:
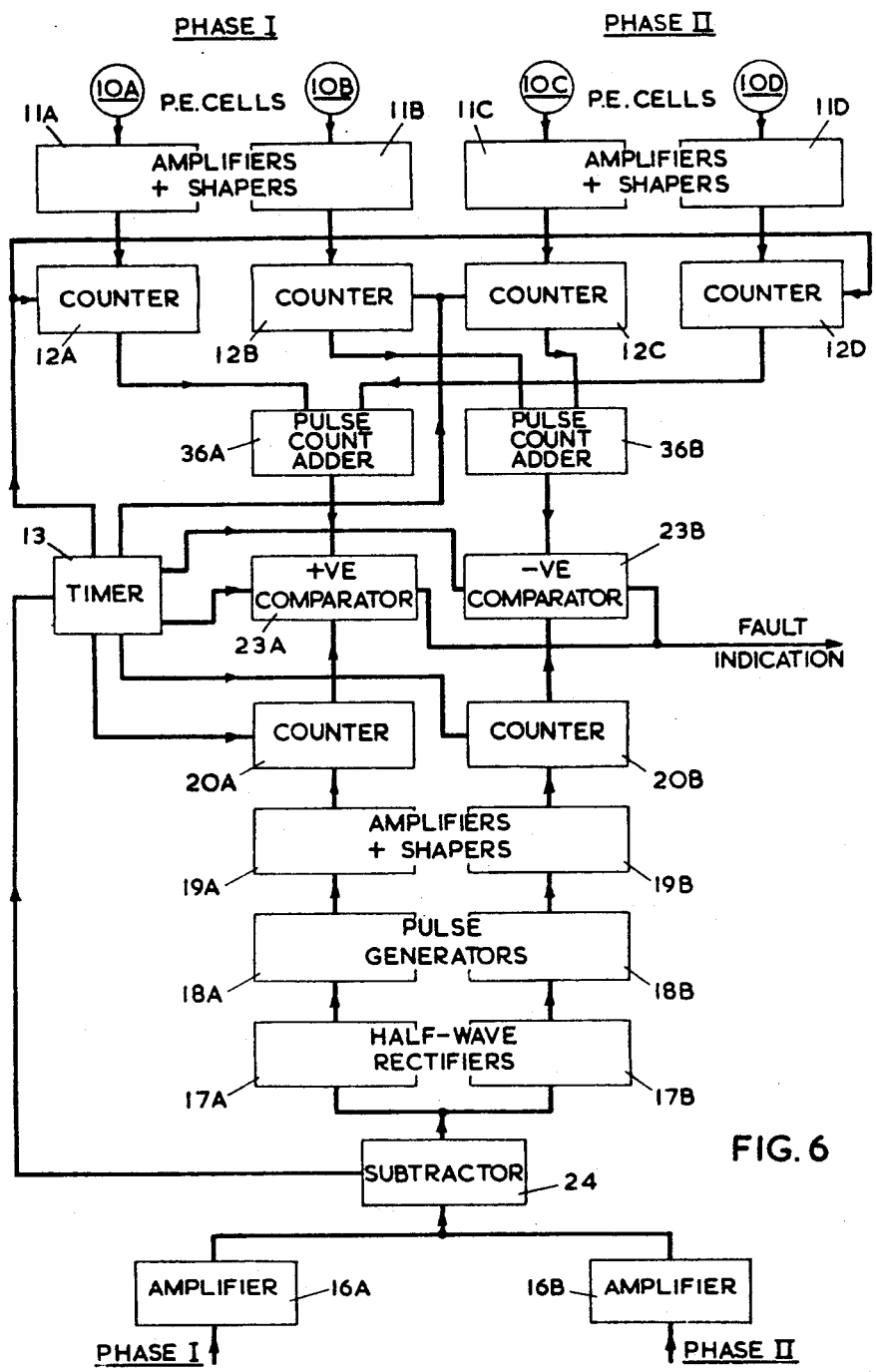
FIGURE 6 is a block diagram of a different form of light-receiving circuitry employed in line-to-line impedance measurement.

Another circuit which would be employed for determining line-line faults is shown in FIGURE 6. The circuit shown in this figure operates in a similar manner to that described with reference to FIGURE 4, insofar as the current-derived signals are concerned, except that pulse count adders 36A, 36B are used instead of the integrators 22A, 22B. Similarly, pulse counters 20A, 20B are employed instead of integrators for the voltage derived signals, the output from the subtractor 24 being applied to these counters through circuit elements 17A, 17B–19A, 19B which are similar in operation to the correspondingly referenced circuits in FIGURE 1.

In each of the systems described above, if a measurement is required of only the mean value of current in the high voltage line, then the pulse counters (FIGURE 1 and FIGURE 6) could be timed to count over a full half cycle of current, or the integrator (FIGURE 4) could be used to integrate continuously instead of over a timed interval.

I claim:

1. A system for measuring an electrical characteristic of a transmission line carrying a high alternating voltage comprising
    first means coupled to said line, said first means including
    monitoring means for separately monitoring the positive and negative half cycles of current through said line and converting the said half cycles into trains of pulses having a repetition rate proportional to the respective magnitudes thereof, and
    transmitting means including a semi-conductor device activated by the trains of pulses to emit a train of pulsating light signals in correspondence therewith,
    second means coupled to said line for separately monitoring the positive and negative half cycles of the voltage of said line and converting said voltage half cycles into trains of pulses having a repetition rate proportional to the respective magnitudes thereof, and
    receiving means remote from said line operative to receive the voltage-representing pulse trains and including
    photo-detector means responsive to the light signals and operable to convert them into a corresponding train of electrical pulses,
    a comparator for comparing these pulse trains from the receiving means and
    a processing circuit for deriving a measurement of said characteristic from this comparison.

2. A system according to claim 1, wherein the receiving means comprises
    integrator circuits for integrating the current and voltage pulse trains, said comparison being effected between the magnitudes of the outputs from said integrator circuits.

3. A system according to claim 1, wherein the receiving comparator is operative to effect a numerical comparison of the current and voltage pulse trains.

4. A system according to claim 1, wherein said comparison of the current- and voltage-representing pulse trains is effected during intervals of time displaced from, and having a predetermined relationship to, one another.

5. A system according to claim 1, comprising phase shifting means for effectively bringing into phase the current and voltage waves from which the current- and voltage-representing pulse trains are developed.

6. A system according to claim 1, wherein said second means for monitoring the voltage of the line comprises a voltage divider, the voltage divider being resistive or capacitive.

7. A system for measuring an electrical characteristic of a transmission line carrying a high alternating voltage, comprising
    a sensing unit secured to said line,
    a processing unit remote from said line, and
    light guide means coupled between these units, the sensing unit including
    monitoring means for separately monitoring the positive and negative half cycles of current through said line and converting the said half cycles into trains of pulses having a repetition rate proportional to both the respective instantaneous magnitudes, and any rate of change, of said current,
    transmitting means including a semi-conductor device activated by the trains of pulses to emit a train of pulsating light signals in correspondence therewith for passage through said light guide means, and
    voltage divider means for separately monitoring the positive and negative half cycles of the voltage of said line and converting said voltage half cycles into trains of pulses having a repetition rate proportional to the respective magnitudes thereof, the processing unit including
    receiving means operative to receive the voltage-representing pulse trains and including
    photo-detector means responsive to the light signals and operable to convert them into a corresponding train of electrical pulses,
    a comparator for effecting a numerical comparison between these pulse trains from the receiving means and
    output means for deriving from this comparison a measurement of said characteristic.

8. A system for measuring the impedance of a transmission line carrying a high alternating voltage, comprising
    a sensing unit secured to said line,
    a processing unit remote from said line, and
    light guide means coupled between these units, the sensing unit including
    monitoring means for separately monitoring the positive and negative half cycles of current through said line, a replica impedance of a predetermined section of said line for developing a voltage proportional to said monitored current,
    a pulse generator for converting said voltage into a current-representing pulse train having a repetition rate proportional to said voltage, transmitting means including a semi-conductor device activated by the train of pulses to emit a train of pulsating light signals in correspondence therewith for passage through said light guide means, and voltage divider means for separately monitoring the positive and negative half cycles of the voltage of said line and converting said voltage half cycles into trains of pulses having a repetition rate proportional to the respective magnitudes thereof, the processing unit including receiving means operative to receive the voltage-representing pulse trains and including photo-detector means responsive to the light signals and operable to convert them into a corresponding train of electrical pulses, a comparator for effecting a numerical comparison between these pulse trains from the receiving means and output means for deriving from this comparison a measurement of said line impedance whereby to detect the occurrence of a fault affecting the line.

References Cited

UNITED STATES PATENTS

| | | | |
|---|---|---|---|
| 2,548,796 | 4/1951 | Houghton | 332—14 XR |
| 2,689,949 | 9/1954 | Kalbach et al. | |
| 2,990,516 | 6/1961 | Johannessen | 332—12 XR |
| 3,048,744 | 8/1962 | Warrington | 317—36 XR |
| 3,346,811 | 10/1967 | Perry et al. | 324—96 |
| 2,717,992 | 9/1955 | Weintraub | 324—52 XR |
| 3,223,889 | 12/1965 | Schweitzer | 317—46 XR |
| 3,281,673 | 10/1966 | Richardson | 324—52 |
| 3,287,636 | 11/1966 | Gagniere | 324—54 |

OTHER REFERENCES

Laser Offers Lower-Cost EHV Current Monitoring, in Electrical World, vol. 162, p. 147, Nov. 16, 1964.

Perry, E. Robert: Laser System Monitors EHV Current, in Electrical World, vol. 162, pp. 72 and 73, Nov. 30, 1964.

Moulton, Clifford H.: Light Pulse System Shrinks High-Voltage Protection Device, Industrial Electronics, May 17, 1965, pp. 71–75.

GERARD R. STRECKER, Primary Examiner

U.S. Cl. X.R.

250—199; 317—36; 324—96; 340—190